United States Patent
Neal et al.

[15] 3,686,352
[45] Aug. 22, 1972

[54] DIMERIZATION PROCESS

[72] Inventors: Arthur H. Neal, 1215 Park St., Baytown, Tex. 77520; Paul T. Parker, 1762 Longwood Dr., Baton Rouge, La. 70808

[22] Filed: Feb. 18, 1970

[21] Appl. No.: 12,381

[52] U.S. Cl.....................260/683.15 D, 260/683.2
[51] Int. Cl...............................................C07c 3/10
[58] Field of Search........................260/683.15 D

[56] References Cited

UNITED STATES PATENTS

| | | | |
|---|---|---|---|
| 3,482,001 | 12/1969 | Eberhardt | 260/683.15 |
| 3,511,891 | 5/1970 | Taylor et al. | 260/683.15 |
| 3,390,201 | 6/1968 | Drew | 260/676 |
| 3,485,881 | 12/1969 | Zuech | 260/666 |

*Primary Examiner*—Paul M. Coughlan, Jr.
*Attorney*—Chasan and Sinnock and John Paul Corcoran

[57] ABSTRACT

Improvements in the process for dimerizing a propylene containing fluid to a $C_6$ olefin containing mixture, said processing improvements comprising the steps of maintaining the temperature of the $C_6$ olefin mixture below 100° F. while isomerizing and separating the mixture into a methyl pentene rich stream and a dimethyl butene rich stream, after which the catalyst is recycled to the dimerization zone in an active condition. Such improvements permit the processing to be carried out in a more efficient and economical manner than heretofore thought possible.

5 Claims, 1 Drawing Figure

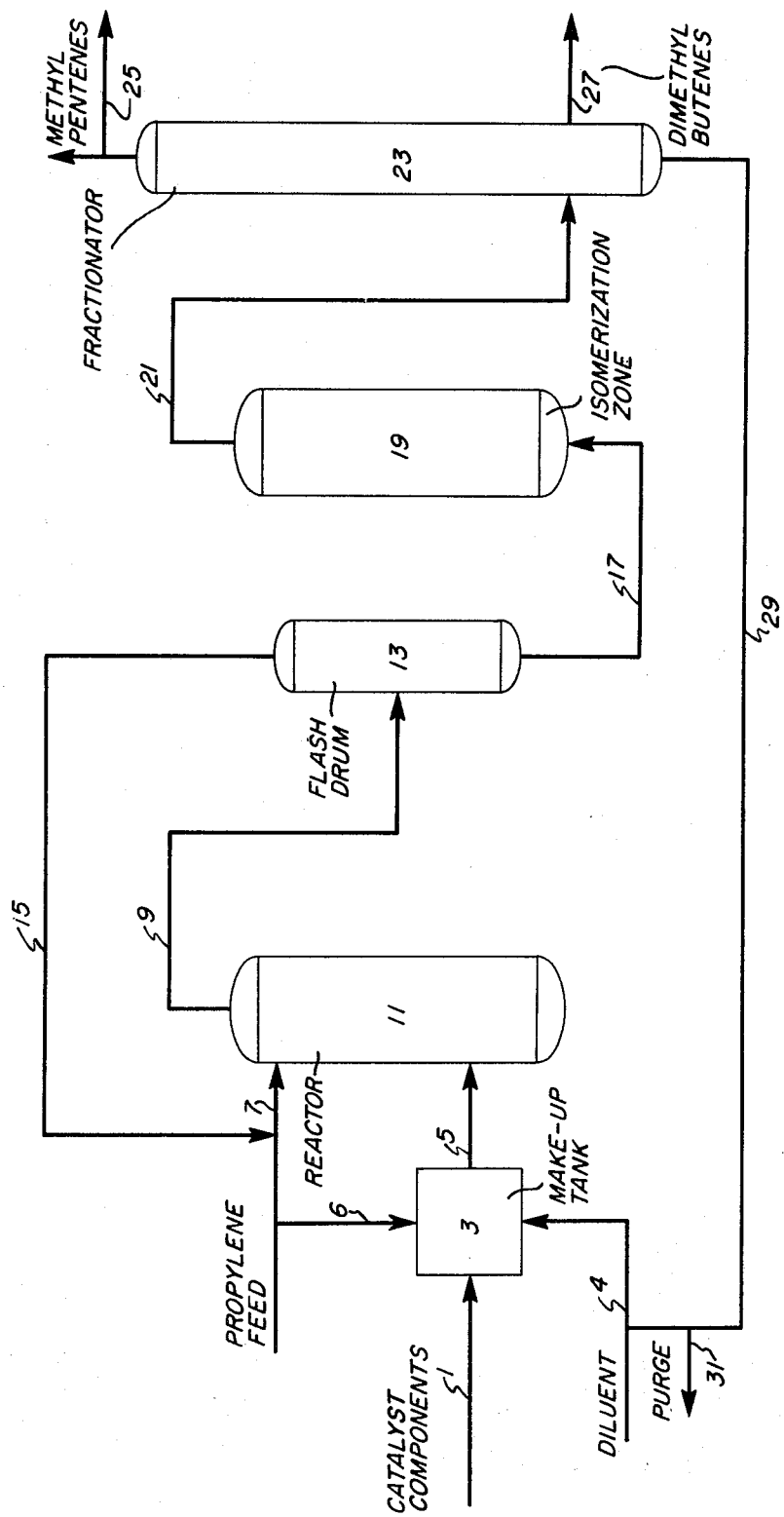

DIMERIZATION PROCESS

This invention relates to a dimerization process. In one aspect, this invention relates to the dimerization of propylene in the presence of a specific catalyst mixture or complex whereby about 90 percent of the propylene is converted to $C_6$ olefins. In a further aspect, this invention relates to isomerizing the olefin mixture prior to separating it into its component parts and to recycle the catalyst in an active condition to the dimerization reactor whereby the reaction can be accomplished in a more efficient and economical manner.

Heretofore, a number of different processes have been proposed, patented or used for the dimerization of a gaseous stream of propylene in order to produce higher alkyl olefin mixtures. These higher alkyl olefins have found use in motor gasoline for increasing the octane rating thereof and more recently they have found use as starting materials for the preparation of valuable chemicals such as isoprene, heptanols and the like.

More particularly, U.S. Pat. No. 3,390,201, issued to Ernest Drew, describes a process for dimerizing propylene to form an olefin mixture containing at least 10 percent dimethyl butenes, i.e., 2,3-dimethyl-1-butene and 2,3-dimethyl-2-butene.

In this process, a propylene-containing gas is contacted with a catalyst complex comprising a metal acetylacetonate, an alkyl aluminum halide and a phosphine at reaction conditions and the desired products are recovered from the reaction mixture.

In carrying out this process, the propylene is dimerized in an inert diluent in which the catalyst complex is soluble and the entire reaction product is subsequently contacted with aqueous caustic in order to extract the catalyst residues from the olefin mixture prior to separation and distillation to recover the $C_6$ product and recycle the diluent. This approach is wasteful of catalyst and leads to relatively high catalyst cost since the catalyst components for this process are quite expensive. In addition, it requires scrupulous drying of the recovered diluent to remove traces of water which otherwise would destroy the activity of the catalyst that is added to the diluent prior to the dimerization step.

It is an object of the subject invention to improve the operating efficiencies of the said process;

It is another object of the subject invention to improve the selectivity of the process for both producing and separating methylpentenes which are valuable raw materials for producing isoprene;

It is a further object of the subject invention for running it under conditions which enable the activity of the catalyst complex to be retained and for recycling the catalyst complex back to the dimerization reactor;

Other objects and advantages of this invention will become apparent to those skilled in the art from the following discussion, appended claims and accompanying drawing, in which the single FIGURE schematically illustrates in the form of a flow diagram the preferred embodiment of this invention.

Briefly this invention comprises the step of dimerizing in the absence of air and moisture a propylene-containing fluid in the presence of a dimerization catalyst under reaction conditions sufficient to dimerize at least 90 percent by weight of said propylene to $C_6$ olefins, said dimerization being carried out in the presence of a solvent having a boiling point of at least 175° F.; isomerizing the $C_6$ olefin mixture; separating the isomerized mixture into a methylpentene-rich stream and a dimethylbutene-rich stream; maintaining the temperature of the olefin mixture below 200° F. during the dimerization, isomerization and separation steps and recycling the catalyst to the dimerization step.

The dimerization catalyst complex comprises (1) a metal belonging to Group VIII of the periodic system, ("Handbook Chemistry and Physics,") Chemical Publishing Company, 45th Edition (1964/B–2) salt or chelate, (2) either an organo-aluminum or an organo-aluminum halide having the structure $AlR_nX_{3-n}$ wherein R represents a hydrocarbyl group containing one to 12 carbon atoms and X represents a halogen such as Cl or Br and $n$ is an integer ranging from 1–3, (3) an electron donating compound of the type $YR_3$ wherein Y represents an element belonging to the fifth group of the periodic system, particularly phosphorus and arsenic and R is a hydrocarbyl group containing one to 12 carbon atoms or hydrogen.

The formation of this catalyst and the activation of it for use in the subject process is described in a copending and now abandoned application bearing, Ser. No. 12,133, Filed Feb. 17, 1970 and the inventor is P. T. Parker. This description of the formation and the activation of the catalyst system for use in this process is incorporated by reference into this application.

Preferably, the metal salt or chelate is a nickel compound. The nickel compounds comprise salts of inorganic and organic acids as well as nickel chelates and nickel coordination complexes. Examples are nickel chloride, nickel sulfate, nickel bromide, nickel iodide, nickel acetate, nickel oxalate, nickel naphthenate, nickel acetylacetonate. In addition, cobalt and iron salts, chelates or coordination complexes have also been found to be useful in this process.

Preferably the organo-aluminum components which are used for the reduction of the nickel salts or chelates are of the type $AlR_nX_{3-n}$ in which R is a hydrocarbyl group containing from one to 12 carbon atoms and preferably from one to six carbon atoms and X is a halogen. Particularly suitable materials include $EtAlCl_2$, $Et_2AlCl$ and mixtures of these, i.e., $Et_3Al_2Cl_3$, as well as bromine substituted halides, e.g., $Et_2AlBr$ and $EtAlBr_2$.

The third component $YR_3$ comprises, for instance, triphenyl phosphine and triphenylarsine, tricyclohexyl phosphine, and other. It is preferred to use those with a relatively high basicity such as tricyclohexylphosphine, tri-n-butyl phosphine and triisopropyl phosphine.

The relative amounts of the components to be used in the formation of the catalyst will vary in accordance with the requirements of the catalyst when used in the dimerization reaction. The Group VIII metal is present in the reaction in an amount ranging from 0.0001 to 0.1 mole per liter of diluent, and preferably from 0.001 to 0.01 mole per liter of diluent. The organo-aluminum compound is present in an amount ranging from 4 to 150 moles per mole of metal and preferably from 5 to 15 moles per mole of metal, while the $YR_3$ compound is present in the range from 0.5 to 15 moles per mole of metal, and preferably from 1 to 10 moles per mole of metal.

Solvents useful in the practice of this invention comprise halogenated aliphatic compounds such as ethylene chloride or aromatic solvents such as benzene, toluene, xylene or halogenated aromatic solvents such as chlorobenzene and dichlorobenzene. Chlorobenzene appears to be an especially good solvent for the process.

With reference to the drawing, the various components making up the catalyst complex are fed through line 1 into a catalyst makeup tank 3 to which is added a suitable diluent through line 4.

The catalyst mixture is made up in tank 3 according to the procedure taught in the above-identified copending application.

The propylene-containing feed is fed via line 7 to the dimerization reactor 11. A portion of the feed is passed into makeup tank 3 in order to saturate the catalyst with the propylene prior to the catalyst being passed via line 5 to the dimerization reactor 11.

The reaction conditions in dimerization reactor 11 are as follows:

The temperature ranges from −60° F. to about 100° F., preferably from −25° to 20° F. The pressure ranges from substantially atmospheric to superatmospheric, preferably pressure ranges from about 14.7 pounds per square inch to about 500 pounds per square inch, and more preferably ranges from about 14.7 pounds per square inch to about 100 pounds per square inch.

The $C_6$ olefin mixture passes via line 9 to a flash tank 13 wherein any unreacted propylene is flashed off and recycled back via line 15 to the propylene feed line 7. The flashing temperature in flash tank 13 is maintained under 50° F.

The $C_6$ olefin mixture passes via line 17 to an isomerization zone 19 wherein standing for a sufficient time it is isomerized to enable the methyl pentenes to be selectively separated from the dimethyl butenes, both of which are contained in the $C_6$ olefin mixture and which possess separate and distinct end uses. The isomerization reaction takes place in the presence of the catalyst complex at a temperature ranging from −25° to 100° F., preferably from 50° to 80° F., over a period of time ranging from 10 minutes to 2 hours, preferably from 20 to 60 minutes. It is to be noted that no additional catalyst has to be added to the tank 19 as the original catalyst contained in the olefin mixture enables this isomerization reaction to take place provided a sufficient residence time is maintained.

The isomerized $C_6$ olefin mixture passes via line 21 to a fractionating column 23 wherein it is separated into a methyl pentene-rich stream which is taken off at the top via line 25 at a reboiler temperature below 100° F. and under a pressure sufficient to vaporize the hexenes at this temperature and recovered. A dimethyl butene rich stream is taken off via line 27 and recovered.

The bottoms from the fractionator 23, which contain the catalyst, diluent and traces of heavy $C_6+$ hydrocarbons, is recycled back via line 29 into the dimerization reactor 11. Some fresh catalyst is added to maintain catalyst activity as required. In addition, a small purge stream 31 may be desirable to minimize the buildup of the heavy hydrocarbons in the recycle stream.

The propylene-containing gas contains from 10 to 100 weight percent propylene, preferably 70 to 100 weight percent propylene.

Further objects and advantages of this invention will become apparent from the following example.

It is to be understood that the various pressures, temperatures, catalyst components recited in this example are only typical of the preferred embodiment and should not be construed to limit this invention unduly.

0.0025 mole of nickel acetylacetonate is mixed with 1 liter of chlorobenzene and the mixture is placed in catalyst makeup tank 3. 0.0025 mole of tricyclohexyl phosphine is added with stirring to the tank 3 and the resulting mixture is cooled to −20° F. Enough propylene is drawn from line 7 into the makeup tank 3 in order to saturate the nickel acetylacetonate. 0.012 mole of ethyl aluminum sesquechloride is added to the mixture and the mixture is then heated to 68° F. The mixture is held at this temperature for a period of 6 minutes. This proved sufficient to activate the catalyst. The active catalyst mixture is then passed via line 5 into the dimerization reactor 11. Propylene is introduced via line 7 into the dimerization reactor at atmospheric pressure at a temperature of −25° F. at a rate of 14.5 kilograms of propylene per gram of nickel per hour, and after 1 hour at the rate of 8.5 kilograms of propylene per gram of nickel per hour. The selectivity to $C_6$ olefins was 93.0 percent as determined by gas chromatography analysis.

The $C_6$ olefin mixture in reactor 11 is transferred via line 9 to flash drum 13 wherein the unreacted propylene is flashed off at a temperature of 50° F. and is recycled via line 15 back to feed line 7. The reaction mixture is then transferred via line 17 to isomerization zone 19, where the reaction mixture is allowed to stand for 1 hour at room temperature. The composition of the mixture prior to being passed to zone 19 as determined by gas chromatography analysis showed the following:

TABLE I

| $C_6$ Product | Weight % |
|---|---|
| 2,3-dimethyl butene-1 | 60.9 |
| 2,3-dimethyl butene-2 | 1.2 |
| methyl pentenes | 36.9 |
| n-hexenes | 1.0 |

After the mixture is allowed to stand for 1 hour in the isomerization zone 19, an analysis of the mixture as determined by gas chromatography showed the following:

TABLE II

| $C_6$ Product | Weight % |
|---|---|
| 2,3-dimethyl butene-1 | 28.9 |
| 2,3-dimethyl butene-2 | 28.3 |
| methyl pentenes | 41.1 |
| n-hexenes | 1.7 |

The isomerized mixture is then transferred via line 21 to a fractionator 23 wherein the maximum liquid temperature is maintained below 86° F. at 90 mm. of mercury. The vacuum fractionation is necessary in order to maintain the temperature below about 86° F. so as not to destroy the activity of the catalyst.

A methyl pentene cut is removed as overhead via line 25 in an amount of 4,313 grams per gram of nickel and the dimethyl butene cut is removed via line 27 in an amount of 1,702 grams per gram of nickel. The catalyst, diluent and any heavy $C_7+$ hydrocarbons are recycled via line 29 back to catalyst makeup tank 3. Any build-up of $C_7+$ hydrocarbons are purged from the recycle line via the purge line 31.

The activity of the recycled catalyst remained the same as it was at the end of the reaction period, namely 8.5 kilograms of propylene per gram of nickel per hour. This indicates that the activity of the catalyst was not impaired by operating according to the conditions set forth hereinabove and recycling it. In addition, the product formed during the second cycle was equivalent to that obtained in the first cycle, which indicates that the catalyst does not lose its activity.

What is claimed is:

1. In a process wherein a propylene-containing fluid is dimerized in the presence of a catalyst complex dispersed in a solvent which has a boiling point above 175° F. at a pressure of one atmosphere, said catalyst complex comprising (1) a metal chelate selected from the group consisting of nickel acetylacetonate, cobalt acetylacetonate and iron acetylacetonate present in an amount ranging from 0.0001 to 0.1 mole of metal per liter of solvent, (2) propylene, (3) an organo-aluminum compound or organo-aluminum halide having the structural formula $AlR_nX_{3-n}$ wherein $n$ represents an integer from 1 to 3, R represents a hydrocarbyl group containing $C_1$ to $C_{12}$ carbon atoms and X represents a halogen, said organo-aluminum compound or organo-aluminum halide being present in an amount ranging from 4 to 150 moles per mole of said metal, and (4) a $YR_3$ compound wherein Y is an element being one selected from Group V of the Periodic Table of the Elements and R represents a hydrocarbyl group containing from $C_1$ to $C_6$ carbon atoms, said compound being present in an amount ranging from 0.5 to 15 moles per mole of metal, said catalyst having been activated by holding it at a temperature ranging from 10° to 80° F. prior to employing it to dimerize the propylene-containing fluid, the improvement in combination therewith of isomerizing the dimerized product at a temperature ranging from −25° to 100° F. and for a period of time ranging from 10 minutes to 2 hours to form a dimethyl butene-rich fraction and a methyl pentene-rich fraction; separating the isomerized reaction product into a dimethyl butene-rich fraction and a methyl pentene-rich fraction; maintaining the temperature of the dimerized product not more than 100° F. during the isomerization and separation steps so as to maintain the activity of the catalyst complex and recycling the catalyst complex.

2. A process according to claim 1 wherein said metal chelate is nickel acetylacetonate.

3. A process according to claim 1 wherein the solvent is one selected from the group consisting of ethylene chloride, benzene, toluene, xylene, chlorobenzene and dichlorobenzene.

4. A process according to claim 1 wherein the separation step is carried out under a vacuum.

5. A process according to claim 1 further including the step of purging the recycle stream in order to remove any hydrocarbons higher than $C_6$ contained therein.

* * * * *